United States Patent
Alexandre et al.

(10) Patent No.: US 10,876,674 B2
(45) Date of Patent: Dec. 29, 2020

(54) IRON-BASED PIPING ELEMENT FOR BURIED PIPELINE, COMPRISING AN OUTER COATING

(71) Applicant: SAINT-GOBAIN PAM, Nancy (FR)

(72) Inventors: Pascal Alexandre, Toul (FR); Gerard Nouail, Metz (FR)

(73) Assignee: SAINT-GOBAIN PAM, Nancy (FR)

(*) Notice: Subject to any disclaimer, the term of this patent is extended or adjusted under 35 U.S.C. 154(b) by 847 days.

(21) Appl. No.: 14/419,553

(22) PCT Filed: Aug. 1, 2013

(86) PCT No.: PCT/EP2013/066220
§ 371 (c)(1),
(2) Date: Feb. 4, 2015

(87) PCT Pub. No.: WO2014/023646
PCT Pub. Date: Feb. 13, 2014

(65) Prior Publication Data
US 2015/0226365 A1     Aug. 13, 2015

(30) Foreign Application Priority Data

Aug. 6, 2012 (FR) .................................. 12 57638

(51) Int. Cl.
*B32B 15/08* (2006.01)
*B32B 3/00* (2006.01)
(Continued)

(52) U.S. Cl.
CPC ............ *F16L 58/1072* (2013.01); *C23C 4/08* (2013.01); *C23C 4/131* (2016.01); *C23C 4/18* (2013.01);
(Continued)

(58) Field of Classification Search
CPC ........ C23C 4/18; C23C 28/021; C23C 28/025; Y10T 428/1393
(Continued)

(56) References Cited

U.S. PATENT DOCUMENTS 4,853,297 A   8/1989   Takahashi et al.
5,518,793 A   5/1996   Pedeutour et al.
(Continued)

FOREIGN PATENT DOCUMENTS

CA   1238587   6/1988
CN   1129975   8/1996
(Continued)

OTHER PUBLICATIONS

Special Chem, Other Adhesion Promoteres, 2018.*
International Search Report, dated Aug. 28, 2013, from corresponding PCT application.

*Primary Examiner* — Ellen S Hock
(74) *Attorney, Agent, or Firm* — Nixon & Vanderhye

(57) ABSTRACT

The iron-based piping element (1), in particular made from cast iron, for a buried pipeline, includes an outer coating (9) including:
- a first layer (11) having at least one porous layer of zinc/aluminum alloy containing 5 to 60 wt % of aluminum;
- a second layer (13) of adhesive situated on the first layer (11); and
- a third layer (15) situated on the second layer (13) and including a synthetic organic material. The method for manufacturing such a piping element is also described.

15 Claims, 1 Drawing Sheet

(51) Int. Cl.

| | | |
|---|---|---|
| *F16L 58/10* | (2006.01) | |
| *C23C 4/08* | (2016.01) | |
| *F16L 58/08* | (2006.01) | |
| *C23C 4/18* | (2006.01) | |
| *F16L 9/147* | (2006.01) | |
| *C23F 13/08* | (2006.01) | |
| *C23C 4/131* | (2016.01) | |

(52) U.S. Cl.
CPC .............. *C23F 13/08* (2013.01); *F16L 9/147* (2013.01); *F16L 58/08* (2013.01); *F16L 58/109* (2013.01); *C23F 2213/32* (2013.01); *Y10T 428/12479* (2015.01); *Y10T 428/13* (2015.01)

(58) Field of Classification Search
USPC .................................. 428/34.1, 35.7, 36.92
See application file for complete search history.

(56) References Cited

U.S. PATENT DOCUMENTS

| | | |
|---|---|---|
| 5,706,866 A | 1/1998 | Pedeutour et al. |
| 2009/0252986 A1 | 10/2009 | Owen et al. |

FOREIGN PATENT DOCUMENTS

| | | |
|---|---|---|
| DE | 100 38 148 A1 | 3/2001 |
| EA | 014517 | 12/2010 |
| EP | 1 059 365 A1 | 12/2000 |
| EP | 1859926 | 11/2007 |
| GB | 2205575 A | 12/1988 |
| JP | 1986-096279 | 5/1986 |
| JP | 63312383 A | 12/1988 |
| JP | 03114823 A | 5/1991 |
| JP | 1996-505928 | 6/1996 |
| JP | 08505929 A | 6/1996 |
| JP | 08510823 A | 11/1996 |
| JP | 11022867 A | 1/1999 |
| JP | 11245333 A | 9/1999 |
| JP | 2001324063 | 11/2001 |
| JP | 2002286169 A | 10/2002 |
| JP | 2012097348 A | 5/2012 |
| KR | 100313990 | 12/2001 |
| KZ | 23688 | 2/2011 |
| RU | 2105231 C1 | 2/1998 |
| RU | 2118740 C1 | 9/1998 |
| RU | 118015 | 7/2012 |
| UA | 58828 | 4/2011 |
| WO | 9417324 | 8/1994 |
| WO | 94/19640 A1 | 9/1994 |
| WO | 9504239 A1 | 2/1995 |
| WO | 2009/073196 A1 | 6/2009 |
| WO | WO2009073716 * | 6/2009 |

\* cited by examiner

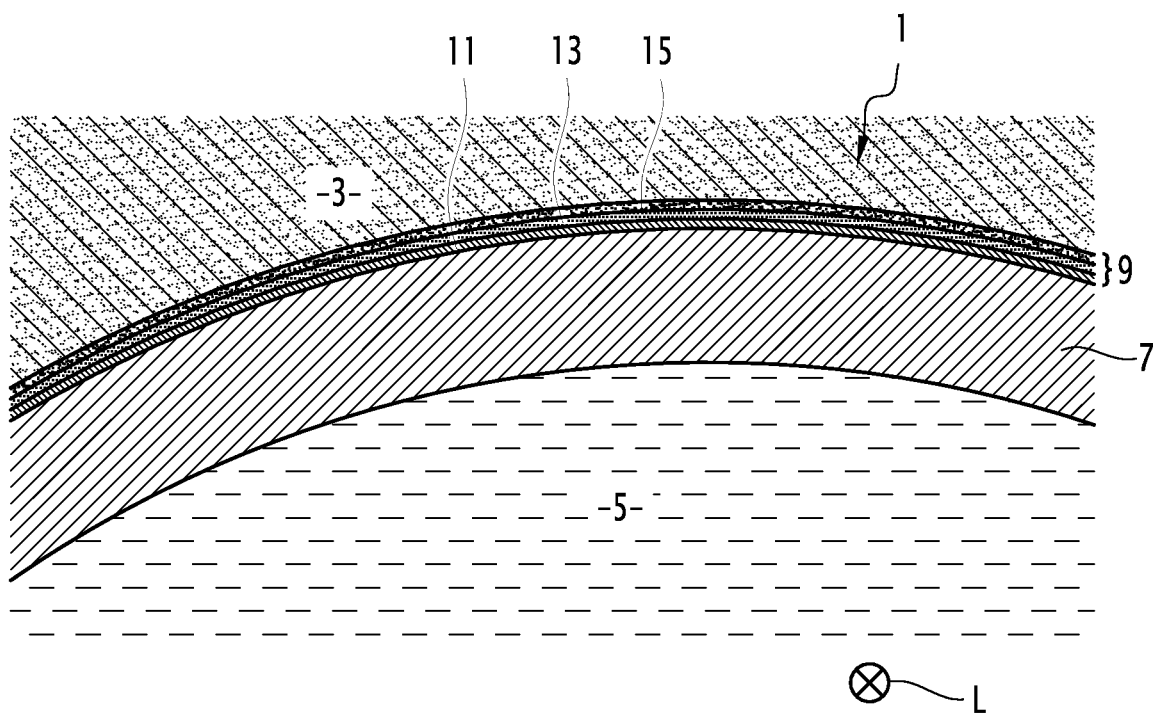

IRON-BASED PIPING ELEMENT FOR BURIED PIPELINE, COMPRISING AN OUTER COATING

BACKGROUND OF THE INVENTION

(a) Field of the Invention

The present invention relates to an iron-based piping element, in particular made from cast iron, for a buried pipeline, comprising an outer coating. These piping elements are in particular used in potable water supply or wastewater lines.

"Piping elements" refers to the pipes as well as various accessories such as elbows, connectors, etc.

(2) Description of Related Art

Soil-related corrosion of ferrous metals is a phenomenon of a different nature from atmospheric corrosion and essentially consists of the creation of oxidation areas electrically associated with reduction areas that may be situated at a certain distance. As a result, localized and consequently significant deterioration of ferrous metal occurs.

Anti-corrosion protection for buried piping elements is a subject of particular difficulty, especially given that the terrain is heterogeneous and of quite varied natures, and the piping, depending on the use thereof, conveys fluids at different temperatures, modifying the corrosion temperatures. Outside anticorrosion protection for the piping elements in particularly corrosive soils, terrain with a low resistivity (seaside, saltmarshes, etc.), very acidic or very alkaline natural terrains, and an environment subject to pollution (whether chemical, agricultural, electrical, etc.), is done by using a coating made from a chemically inert synthetic material that acts as a sealing barrier and prevents access of the electrolyte of the soil in contact with the cast iron.

The improvement of anti-corrosion protection systems has led to a decrease in cases of corrosion on pipelines.

According to the work *Pipeline risk management manual*—third edition—W. Kent Muhlbauer—Gulf Professional Publishing—Elsevier, pages 3/43 to 3/45, third-party damage is the leading cause of failures in buried pipelines. The US Department of Transportation has confirmed that third-party accidents are the leading cause of damage, responsible for 20 to 40% of cases. Data from the European gas industry also indicates that ruptures caused by third parties represent 50% of failures.

In fact, the handling of the piping elements designed to be buried frequently leads to injury to their outer surfaces in several locations. This is particularly true when the volume, bulk and mass of the piping elements are high.

Third-party damage may lead to an immediate rupture of the pipeline when the structure of the pipeline is greatly attacked, or damage of an outside anticorrosion coating. The cast iron of the wall of the piping element is then left without protection against attacks from the soil. In that case, the rupture may occur several years after damage, due to corrosion of the metal.

Thus, when the anticorrosion protection is provided by a barrier coating, which electrically isolates the pipeline, the life expectancy of the pipeline is greatly decreased following damage to that coating.

The invention aims to provide an iron-based piping element for a buried pipeline having improved resistance to corrosion, in particular in case of damage to its outer surface by a third party, for example during placement or later in case of an operation near the piping element.

BRIEF SUMMARY OF THE INVENTION

To that end, the invention relates to an iron-based piping element, in particular made from cast iron, for a buried pipeline, comprising an outer coating, the piping element being characterized in that the outer coating comprises:
  a first layer comprising at least one porous layer of zinc/aluminum alloy containing 5 to 60 wt % of aluminum;
  a second layer of adhesive situated on the first layer; and
  a third layer situated on the second layer and comprising a synthetic organic material.

"Comprising at least one porous layer of zinc/aluminum alloy" does not rule out that the first layer may be made up only of the porous layer of metal alloy, i.e., made up of a single layer.

According to other specific embodiments, the coating may comprise one or more of the following features, considered alone or according to all technically possible combinations:
  the first layer is made up of said porous layer of zinc/aluminum alloy;
  the first layer further comprises a layer of sealant paint situated between the porous layer of zinc/aluminum alloy and the second layer, preferably situated on the porous layer of zinc/aluminum alloy;
  the second layer comprises a holtmelt glue;
  the second layer includes an anticorrosion pigment and/or a bactericidal agent;
  the second layer is substantially provided without metal components;
  the synthetic organic material comprises polyethylene, for example bimodal high-density polyethylene, or comprises polypropylene;
  the synthetic organic material comprises polyethylene or polypropylene reinforced by hard mineral fillers;
  the third layer includes a coloring agent, in particular fluorescent, imparting a maximum contrast to the piping element with respect to the color of the soil in which the piping element is intended to be buried;
  the third layer has a strong light reflecting power, in particular obtained owing to mineral fillers;
  the porous layer of zinc/aluminum alloy has a surface density of at least 300 g/m$^2$ and preferably at least 400 g/m$^2$;
  the porous layer of zinc/aluminum alloy contains from 10 wt % to 30 wt % of aluminum;
  the porous layer of zinc/aluminum is made up of a Zn/Al alloy with 15 wt % of aluminum and 85 wt % of zinc;
  the porous layer of zinc/aluminum alloy includes one or more additional alloy elements, advantageously chosen from among magnesium, tin, copper and silver, with content levels that may reach 5 wt %;
  the porous layer of zinc/aluminum alloy is deposited with a surface density of at least 300 g/m$^2$, preferably at least 400 g/m$^2$;
  the hard mineral fillers comprise quartz and/or wollastonite;
  the hard mineral fillers advantageously represent between 1 wt % and 20 wt % of the third layer.

The invention also relates to a buried pipeline comprising piping elements as described above.

The invention lastly relates to a method for manufacturing a piping element as described above, comprising at least the following steps:
(a) depositing the porous layer of zinc/aluminum alloy by arc metallization;
(b) depositing the second layer; and
(c) depositing the third layer.

According to specific embodiments, the method may comprise one or more of the following features, considered alone or according to all technically possible combinations:
the porous layer of zinc/aluminum alloy is deposited with a surface density of at least 300 g/m$^2$ and preferably at least 400 g/m$^2$;
the second layer and the third layer are respectively deposited, as desired, by extrusion, spraying, or co-extrusion of both;
a coloring agent, in particular fluorescent, is added to the synthetic organic material of the third layer during extrusion, co-extrusion or spraying of the third layer, so as to obtain a color contrast with the soil in which the piping element is intended to be buried.

The invention also relates to an iron-based piping element, in particular made from cast iron, for a buried pipeline, comprising an outer coating, the piping element being characterized in that the outer coating comprises:
a first porous layer of zinc/aluminum alloy containing 5 to 60 wt % of aluminum;
a second layer of adhesive situated on the first layer; and
a third layer situated on the second layer and comprising a synthetic organic material.

According to other specific embodiments, the coating may comprise one or more of the following features, considered alone or according to all possible combinations:
the first layer has a surface density of at least 300 g/m$^2$ and preferably at least 400 g/m$^2$;
the first layer contains from 10 wt % to 30 wt % of aluminum;
the first layer is made from a Zn/Al alloy with 15 wt % of aluminum and 85 wt % of zinc;
the first layer includes one or more additional alloy elements, advantageously chosen from among magnesium, tin, copper and silver, with content levels that may reach 5 wt %;
the first layer is deposited with a surface density of at least 300 g/m$^2$, preferably at least 400 g/m$^2$.

The invention also relates to a buried pipeline comprising piping elements as described above.

The invention lastly relates to a method for manufacturing a piping element as described above, comprising at least the following steps:
(a) depositing the porous layer of zinc/aluminum alloy by arc metallization;
(b) depositing the second layer; and
(c) depositing the third layer.

According to specific embodiments, the method may comprise one or more of the following features, considered alone or according to all technically possible combinations:
the first layer is deposited with a surface density of at least 300 g/m$^2$ and preferably at least 400 g/m$^2$.

BRIEF DESCRIPTION OF THE SEVERAL VIEWS OF THE DRAWINGS

The invention will be better understood upon reading the following description, provided solely as an example, and done in reference to the sole FIGURE, which is a partial diagrammatic view of a transverse section of a piping element according to the invention.

DETAILED DESCRIPTION OF THE INVENTION

The FIGURE shows a piping element 1 according to the invention. The piping element 1 is buried in a soil 3 and is used to convey a fluid 5, for example water. The piping element 1 is part of a buried pipeline (not shown) comprising a plurality of piping elements similar to the piping element 1.

The piping element 1 comprises a raw piping element 7 and an outer coating 9 situated between the soil 3 and the raw piping element 7, advantageously distributed on the raw piping element 7 so as to isolate it from the soil 3.

The raw piping element 7 is iron-based, advantageously ductile cast iron. "Ductile cast iron" refers to a cast iron in which the graphite is essentially present its original form.

The raw piping element 7 is for example a pipe. In the illustrated example, it extends in a longitudinal direction L perpendicular to the plane of the FIGURE. Only a portion of the transverse section of the raw piping element 7 is shown in the FIGURE, the rest of the section being able to be extrapolated easily from the illustrated portion.

The fluid 5 circulates inside the raw piping element 7 in the longitudinal direction L. An inner coating, not shown, may exist on an inner wall of the raw piping element 7, to isolate the fluid 5 from the piping element 7. This inner coating is advantageously cement mortar-based or has a base of a polymer material.

The outer coating 9 comprises a first layer 11 situated on the raw piping element 7, a second layer 13 situated on the first layer 11, and a third layer 15 situated on the second layer 13.

The first layer 11 is porous. It is made up of a zinc/aluminum alloy containing 5 to 60 wt % of aluminum. The first layer 11 is deposited on the outer wall of the raw piping element 7, advantageously by electric arc metallization.

Advantageously, the first layer 11 contains from 10 wt % to 30 wt % of aluminum, and is in particular formed by a Zn/Al alloy with 15 wt % of aluminum and 85 wt % of zinc. The alloy may also include other metals, such as magnesium, tin, copper and silver, in quantities of up to 5 wt %. The first layer 11 for example has a surface density of at least 300 g/m$^2$, preferably at least 400 g/m$^2$.

The second layer 13 is an adhesive. It provides a mechanical link between the first layer 11 and the third layer 15.

The adhesive is advantageously a holtmelt glue. This glue is advantageously provided with no metal component.

The adhesive advantageously has one or more of the following properties:
high adherence power on the polymers, in particular on the polypropylene or polyethylene;
a rheology and a creep resistance suitable for extreme service climate conditions, for example full sunshine, a high ambient storage temperature of up to 60° C., a low ambient storage temperature of up to −40° C., and/or a temperature of the fluid 5 that may reach 60° C.;
it comprises at least one active ingredient, for example a bactericidal agent such as copper, silver and their salts or oxides, and/or an anticorrosion pigment such as, for example, zinc phosphate, zinc oxide, modified zinc oxide and mixtures thereof, making it possible to increase the protective power of the first layer 11 once the first layer 11 is exposed to corrosion, as will be explained below.

The adhesive for example has a base of a vinyl ethylene-acetate copolymer or an ethylene-acrylate copolymer.

The third layer 15 is made up of a synthetic organic material, for example polyethylene-based resin, for example a bimodal high density polyethylene base, or is made up of a polypropylene-based resin. The third layer 15 advantageously has a thickness comprised between approximately 1 mm and 5 mm.

The polyethylene or polypropylene resin of the third layer 15 advantageously includes hard mineral fillers, to reinforce its resistance to mechanical attacks due to third parties or hard points in the soil 3.

The hard mineral fillers are for example quartz and/or wollastonite. The quantity of hard mineral fillers advantageously represents between 1 wt % and 20 wt % of the third layer 15.

Advantageously, a distinctive marking of the outer surface of the third layer 15 is done, so as to identify the nature of the conveyed fluid. The marking is for example done using colored strips following national or international color codes (ISO standard R 508—1966). The strips are for example printed or co-extruded on the third layer 15.

Simultaneously or alternatively, the synthetic organic material of the third layer 15 may comprise pigments or coloring agents, preferably fluorescent, to give the third layer 15 a color defining a maximum contrast with the color of the soil 3. This allows better visual detection of the piping element 1, which considerably reduces the risks of inadvertently damaging the piping element 1. It has in fact been observed that the warning grates often placed above pipelines are not always sufficient to avoid such damage.

For example, if the pipeline is placed in a soil 3 consisting of Fontainebleau sand, with a light color, the third layer 15 is chosen to have a dark color, advantageously black or dark blue, to maximize the contrast between the soil 3 and the pipeline.

The third layer 15 normally forms a sealed barrier between the metal wall of the raw piping element 7 and the soil 3. It then prevents any contact between the ductile cast iron and the water from the soil 3 acting as an electrolyte.

The first layer 11 is only exposed in case of injury of the coating 9 damaging the third layer 15. The first layer 11 then offers additional anticorrosion protection and thereby makes it possible to postpone the appearance of a failure of the piping element 1. The timeframe for the appearance of a failure is conditioned on the characteristics of the first layer 11 and the second layer 13, which provide a mechanical link between the cast-iron wall and third layer 15.

As long as, and when, the third layer 15 is not damaged, the third layer 15 acts passively, by forming a barrier layer against the spread of corrosion. When the third layer 15 is damaged, the first layer 11 acts actively, providing galvanic protection of the piping element 1.

In fact, under the action of the corrosive agents from the soil 3, the first layer 11 then transforms into a layer protecting against corrosion products that is stable in the medium where it was born. The layer of zinc/aluminum alloy is also said to be "sacrificial" with respect to the cast iron, in that it may consume itself gradually by oxidation under the effect of the electrochemical cell formed by the cast-iron, the alloy and the soil, to protect the underlying cast-iron or the cast-iron that has been bared at the defects in the layer of alloy, by forming said protective layer.

Due to its metal arc deposition, the first layer 11 is made up of solidified droplets and is therefore porous, and, through a suitable choice of the size of the pores and the thickness of the first layer 11, it is possible to adjust the conditions, in particular the speed, of formation of the protective layer. It has been observed that the biphasic structure of the zinc/aluminum alloy favors the trapping of products corroding zinc.

Furthermore, due to its metal microstructure, the first layer 11 is ductile. In case of impact or damage of the third layer 15 by a third party, the first layer 11 is plastically deformed and remains adhered to the ductile cast iron. Ductility of the first layer 11 contributes to the lastingness of the protection, even after damage of the third layer 15.

We will now describe a method for manufacturing the piping element 1. The method comprises a step a) for depositing, on the raw piping element 7, the first layer 11 as described above; a step b) for depositing, on the first layer 11, a second layer 13 as described above; and a step c) for depositing, on the second layer 13, the third layer 15 as described above.

The outer coating 9 defined above is applied on the head of the raw piping element 7 taken after the passage thereof in the heat treatment furnace, therefore having a skin made up of iron oxides.

In step a), a zinc-aluminum alloy is deposited by electric arc metallization, said alloy containing 5 to 60 wt % of aluminum, and preferably 10 to 30 wt % of aluminum, and more particularly 15 wt % of aluminum, to form the first layer 11. The first layer 11 is deposited with a surface density of at least 400 g/m$^2$.

In step b), a holtmelt glue is deposited by hot spraying, or by extrusion, to form the second layer 13.

In step c), a layer of polyethylene or polypropylene is deposited by extrusion, or spraying, to form the third layer 15.

In one alternative, steps b) and c) may be carried out simultaneously, for example by co-extrusion of the second layer 13 and the third layer 15.

The aforementioned pigment or coloring agent is added into the material of the third layer 15 during extrusion, spraying or co-extrusion thereof.

Owing to the characteristics of the piping element 1 described above, the latter offers improved resistance to corrosion, in particular in case of damage of its outer surface by a third party, for example during placement or later in case of an operation near the piping element.

According to another alternative, the first layer 11 comprises a porous layer of zinc/aluminum alloy containing 5 to 60 wt % of aluminum, and a layer of sealing paint (not shown) situated between the porous layer of zinc/aluminum alloy and the second layer 13. Advantageously, the first layer 11 only includes these two layers.

The layer of sealing paint is for example situated on the porous layer of zinc/aluminum alloy. Advantageously, the layer of sealing paint covers the porous layer of zinc/aluminum.

The layer of sealing paint for example comprises a bituminous paint or a synthetic resin-based paint in solvent phase, for example an epoxy resin of polyurethane, or in aqueous phase, for example such as an acrylic resin. "In solvent phase" means that the synthetic resin is dissolved in an organic solvent.

The layer of sealing paint for example has a thickness of approximately 0.1 mm and is advantageously applied on the porous layer of zinc/aluminum alloy by spraying.

The layer of sealing paint seals the pores of the porous layer of zinc/aluminum alloy and provides additional protection of the metal alloy.

The invention claimed is:

1. An iron-based piping element for a buried pipeline in a soil, comprising a raw piping element and an outer coating, the raw piping element comprising a metal wall, wherein the outer coating comprises:
   a first layer situated on the raw piping element and comprising at least one porous layer of zinc/aluminum alloy containing 5 to 60 wt % of aluminum;
   a second layer of adhesive situated on the first layer; and
   a third layer situated on the second layer and comprising a synthetic organic material, the third layer forming a sealed barrier between the metal wall of the raw piping and the soil,
   wherein the second layer of adhesive provides a mechanical link between the first layer and the third layer,
   wherein the third layer forming a sealed barrier prevents any contact between the metal wall of the raw piping element and water from the soil, and
   wherein the second layer and the third layer consist of different material compositions.

2. The piping element according to claim 1, wherein the first layer is made up of said porous layer of zinc/aluminum alloy.

3. The piping element according to claim 1, wherein the first layer further comprises a layer of sealant paint situated between the porous layer of zinc/aluminum alloy and the second layer.

4. The piping element according to claim 1, wherein the second layer comprises a holtmelt glue.

5. The piping element according claim 1, wherein the second layer includes an anticorrosion pigment and/or a bactericidal agent.

6. The piping element according claim 1, wherein the second layer is provided without metal components.

7. The piping element according to claim 1, wherein the synthetic organic material comprises polyethylene, for example bimodal high-density polyethylene, or comprises polypropylene.

8. The piping element according to claim 1, wherein the synthetic organic material comprises polyethylene or polypropylene reinforced by hard mineral fillers.

9. The piping element according to claim 1, wherein the third layer includes a coloring agent imparting a maximum contrast to the piping element with respect to the color of the soil in which the piping element is intended to be buried.

10. A buried pipeline comprising piping elements according to claim 1.

11. An iron-based piping element according to claim 1, wherein the third layer has a thickness comprised between 1 mm and 5 mm.

12. An iron-based piping element according to claim 1, wherein the raw piping element is made from cast iron.

13. An iron-based piping element for a buried pipeline in a soil, comprising a raw piping element and an outer coating, the raw piping element comprising a metal wall, wherein the outer coating comprises:
   a first layer situated on the raw piping element and comprising at least one porous layer of zinc/aluminum alloy containing 5 to 60 wt % of aluminum;
   a second layer of adhesive situated on the first layer, the adhesive selected from the group consisting of a hot-melt glue having a base of a vinyl ethylene-acetate copolymer and a hot-melt glue having a base of an ethylene-acrylate copolymer; and
   a third layer situated on the second layer and comprising a synthetic organic material, the third layer forming a sealed barrier between the metal wall of the raw piping and the soil, the third layer selected from the group consisting of a polyethylene-based resin and a polypropylene-based resin,
   wherein the second layer of adhesive provides a mechanical link between the first layer and the third layer,
   wherein the third layer forming a sealed barrier prevents any contact between the metal wall of the raw piping element and water from the soil.

14. The piping element according to claim 13, wherein the first layer is made up of said porous layer of zinc/aluminum alloy.

15. The piping element according to claim 13, wherein the first layer further comprises a layer of sealant paint situated between the porous layer of zinc/aluminum alloy and the second layer.

* * * * *